United States Patent [19]
Maucher

[11] 3,815,715
[45] June 11, 1974

[54] CLUTCH RELEASE

[75] Inventor: Paul Maucher, Sasbach, Germany

[73] Assignee: Luk Lamellen und Kupplungsbau GmbH, Buhl/Baden, Germany

[22] Filed: Oct. 24, 1972

[21] Appl. No.: 299,670

[30] Foreign Application Priority Data
Nov. 12, 1971  Germany............................ 2156161

[52] U.S. Cl................ 192/98, 192/110 B, 308/233, 308/236
[51] Int. Cl......................... F16c 19/00, F16c 33/30
[58] Field of Search........... 192/110 B, 98; 308/233, 308/232, 236

[56] References Cited
UNITED STATES PATENTS

| | | | |
|---|---|---|---|
| 1,431,551 | 10/1922 | White | 192/110 B |
| 2,403,460 | 7/1946 | Rozner | 308/233 |
| 2,995,406 | 8/1961 | Pitner | 192/98 |
| 3,416,637 | 12/1968 | Maurice | 192/98 |
| 3,625,327 | 12/1971 | Birdsey | 192/110 B |

Primary Examiner—Samuel Scott
Assistant Examiner—Lance W. Chandler
Attorney, Agent, or Firm—Herbert L. Lerner

[57] ABSTRACT

A clutch release for use in motor vehicle clutches or the like includes a bearing and means for mounting the bearing. The bearing has two races, one of which is engaged by clutch release means while the other race is acted upon by clutch operating means. The bearing is mounted in such a way as to provide for limited movement or displacement relative to the mounting means whereby automatic centering with respect to the axis of the clutch may be obtained.

Means are operably disposed between the mounting means and one of the bearing races which permits said limited movement or displacement of the bearing while preventing rotation of the last mentioned bearing race.

19 Claims, 8 Drawing Figures

CLUTCH RELEASE

The invention relates to clutch releases and more particularly to clutch releases for motor vehicle clutches of the type which have become known, for example, as centrally-guided clutch releases, as disclosed in German Published Pat. application 1,600,080 and as pivoted clutch releases as disclosed in French Pat. 1,287,978. These known clutch releases comprise an anti-friction bearing in which one of the bearing races serves to engage the clutch release means, and more specifically, to either directly or indirectly engage cup spring tabs or levers, while the other bearing race is acted upon by the clutch operating means, for example, by means of a release fork, by mechanically, hydraulically or pneumatically actuated sliders or the like. The bearing is arranged with a limited amount of movement relative to its mounting which is, in the form of a sliding sleeve, housing or the like, for automatic centering with respect to the axis of the clutch.

In the aforementioned German Published Patent, the bearings are movable to a limited extent in a radial direction by means of firction clamping means in the form of a cup spring and friction lining, which are effective in the axial direction. In the above-mentioned French Patent, the bearings are arranged in a cage with limited mobility in all three dimensions.

It has been found, however, that not only in clutch releases of the type disclosed in the aforementioned French Patent, but also in clutch releases according to the previously mentioned German Patent Application, failures and other problems occur after a relatively short period of time. For example, small amounts of impurities may penetrate into the assembly. While such impurities may not have a detrimental effect, particularly at low temperatures, due to the solidification of the bearing grease, the normally non-rotating bearing race also rotates, whereby increased wear occurs at the friction linings as well as at the cup springs for example, in the case of clutch releases according to the previously mentioned German Application and leads to premature failure.

It is an object of the present invention to overcome the aforementioned disadvantages of known prior art arrangements and to provide a clutch release in which the bearing race acted upon by the clutch operating means is prevented from rotating, while at the same time making provisions to retain limited play or limited mobility to provide for centering the bearing with respect to the axis of the clutch.

According to the present invention, the aforementioned object is achieved by making provision to secure the bearing against rotation by positive locking means, for example, by the use of stop means which positively locks the bearing against rotation. In this connection it is preferable that the securing means is effective between the stationary bearing race and the mounting for the bearing.

One embodiment of a clutch release according to the present invention is obtained by providing a stop means which is effective between the bearing mounting and the second bearing race. For this purpose the non-rotating bearing race may have on the side facing the contact areas of the mounting, a radially disposed slot within which a pin, dog, or the like projects from the previously mentioned contact area of the mounting, the arrangement being such that the bearing race can rotate to a limited extent, while the bearing can furthermore slide longitudinally back and forth in the slot. Accordingly, movement of the bearing is therefore made possible for centering with respect to the axis of the clutch in both directions, that is, in the lengthwise direction on the one hand and in the direction of the width on the other hand, thereby providing for centering in all situations or positions.

Another embodiment of the invention which may be preferred for different applications consists of providing between the bearing and the mounting, guides which are effective crosswise to each other and perpendicular to the axis, and wherein one guide is effective in one direction and the other guide is effective in the other direction. For this purpose it is preferable to provide at lease one intermediate element operably disposed between the second bearing race, that is, the stationary bearing race, and the mounting, and against which the bearing is movable in the one direction of the mounting and wherein the bearing is movable in the other direction together with the intermediate element. It may be preferrable to provide the intermediate element in the form of a disc or the like and having preferably two projections such as bumps, prongs, dogs, pins or the like which are received in slots or guides matched to the projections. For example, the slots or guides may be provided in the second bearing race. The projections of the intermediate element may project in a radial or axial direction and be received in matching slots or guides in the bearing race, and therefore make possible movement of the bearing relative to its mounting in the one direction.

Movement of the bearing relative to its mounting in the other direction, that is, preferably perpendicularly thereto, can be made possible for example, by providing the intermediate element with preferably two projections, such as bumps, prongs, dogs, pins or the like, which are received in correspondingly matched guides or slots in the mounting.

For the majority of applications, the embodiment described above may be the simplest and most practical. For some applications, however, it may be advantageous to provide the bearing with projections, raised portions, bumps or the like which engage in guide elements or slots in the intermediate element, also the mounting may be provided with such projections which engage with guides, slots or the line in the intermediate element.

In order to enable the intermediate element to move in one direction between the bearing race and the mounting, it is further possible to provide this element with at least one recess which engages guide portions extending in the axial direction of the mounting, for example, a square. The recess or recesses are larger at least in the direction of motion of the plate than the axial region of the mounting covered.

However, the bearing may also be provided with a square which is held within a guide, for instance, a larger square recess. The reverse, of course, is also possible.

In the clutch releases according to the invention, anti-friction bearings of any design, for example, radial bearings, axial bearings, and the like may be used. It is particularly advantageous to provide holding means to limit movement in the radial direction. It is furthermore particularly advantageous to provide, for example, in addition, holding means which are effective in the axial direction. With such an arrangement it is possible to provide in particular that the co-rotating bearing race, at least in the condition when the clutch release is in contact with the clutch release means, does not run up against stationary parts of the clutch release, such as the mounting, the intermediate element or the like, and furthermore, a connection between the bearing and the mounting is assured by the holding means, which is effective in the axial direction.

In a clutch release according to the present invention, if a radial bearing with rotating inner race is used for example, the holding means may be provided at a housing-like mounting, so that a partial, cage-like part extends over the bearing. If the clutch release is a so-called centrally guided release, by appropriate selection of the dimensions of the housing, it is possible to thereby prevent rotating parts of the arrangement, for instance, the inner race, from rubbing against the sliding guide element of the clutch release.

Such a clutch release can, however, be used also in a particularly advantageous manner as a pivoted clutch release, if at the mounting or the housing engagement or attachment means are provided for the clutch operating means, for example in the form of a release fork.

A similar advantageous embodiment is obtained if the non-rotating bearing race, for example, the outer race of the bearing, is firmly connected with a holding or securing means which extends over radially spaced areas of the mounting wherein the radial spacing corresponds at least approximately to the amount of play. In this connection, play can be present in the radial as well as in the axial direction.

It is particularly advantageous if means affording a resistance to displacement is provided, for example by providing friction, restraining, or damping means or the like to counteract the displacement of the bearing and-/or the intermediate element. For this purpose the above-mentioned clutch release having a cage-like extension over the bearing between the non-rotating bearing race and the holding or securing means may be provided with an element which is resilient in the axial direction, such as for example, a cup spring, a corrugated ring or the like. Similarly, such an element which is resilient in the axial direction, may bear on the one hand, against such securing or holding means which are attached at the bearing and extend over radial areas of the mounting, and on the other hand, against the mounting.

On the other hand, however, such a cup spring can simultaneously serve as a securing or holding means and likewise perform the function of affording a resistance to displacement of the bearing. In such a case, by way of example, the cup spring bears, on the one hand, directly or indirectly against the mounting, for instance, against the sliding sleeve of the clutch release and, on the other hand, directly or indirectly through friction linings or the like, against the non-rotating bearing race.

The stop or securing means which is effective in at lease one direction may, however, also be formed by the intermediate element by providing the latter, for example in a design of a clutch release with revolving inner race, with projections such as bent tabs, prongs or the like which engage over or under at least one of the bearing races and against which the non-rotating bearing race rests after overcoming the permissible play.

Although the invention is illustrated and described herein in relation to specific embodiments, it is nevertheless not intended to be limited to the details shown, since various modifications and structural changes may be made therein without departing from the spirit of the invention and with the scope and range of equivalents of the claims.

The construction and operation of the invention, however, together with additional objects and advantages thereof will be best understood from the following description of specific embodiments when read in connection with the accompanying drawings, in which.

Figure 1:
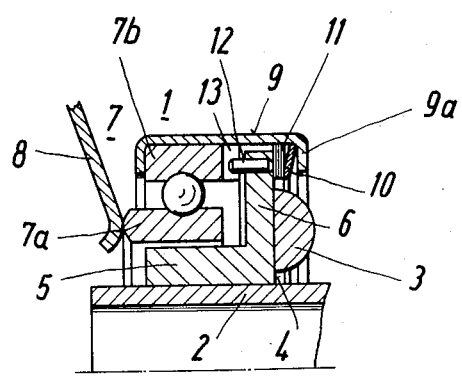
FIG. 1 is a partial sectional view of a centrally guided clutch release according to one embodiment of the invention.

Referring to the drawings, FIG. 1 shows a centrally guided clutch release 1 which is axially movable along a guide tube 2, for example by a clutch actuating means or release fork 3. The clutch release 1 comprises a mounting 4 which comprises an axially extending portion or sliding guide 5 and a radially extending portion or flange 6. A ball bearing 7 is disposed on the mounting 4 and is adapted to slide thereon as will be explained. The bearing 7 has an inner race 7a which serves to actuate a clutch release means which in the embodiment of FIG. 1 comprises tabs 8 of a cup spring clutch. The outer race 7b is stationary and is adapted to be acted upon by the release clutch actuating means 3 via the flange 6 of the mounting 4.

The bearing 7 comprises a securing or holding means 9 in the form of a sleeve press-fitted on the outer race and which extends over and spaced from the radial outer portion of the mounting 4 and which has a portion 9a axially spaced from the mounting 4. A cup spring 10 bears, on the one hand, against the portion 9a of the sleeve 9 which extends over the mounting 4 and on the other hand, faces in the direction toward the flange 6 to bear against a friction lining 11 provided between the cup spring 10 and the flange 6. The cup spring 10 provides a resistance to axial displacement of the bearing which, after centering with respect to the axis of the clutch, causes the bearing 7 to remain in this position.

It is preferable to choose a radial spacing between the sleeve 9 and the flange 6 so that the revolving inner race 7a will not contact or rub against the sleeve-like portion 5 of the mounting in any position.

In order to secure the outer race 7b of the bearing 7 against rotation while still permitting the centering of the bearing with respect to the axis of the clutch, a stop in the form of a pin 12 is provided which extends between the bearing 7 and the mounting 4 and which projects into a slot 13 in the outer bearing race 7b. The arrangement is such that the bearing may slide axially and thus can be centered properly with respect to the axis of the clutch with the danger of the outer race 7b rotating eliminated.

Figure 2:
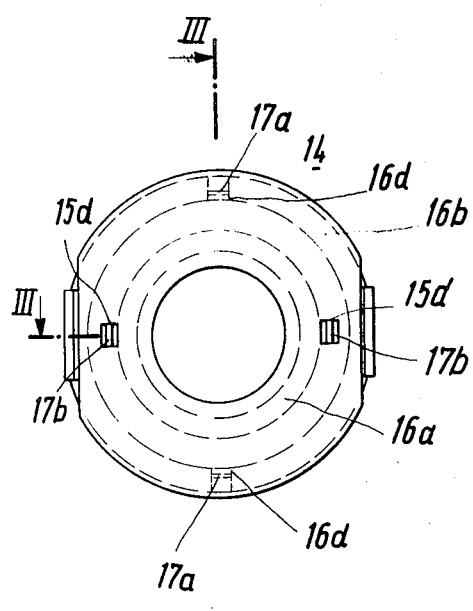
FIG. 2 is an elevational view looking in the direction of arrow II in FIG. 3 showing an alternate embodiment of a clutch release.
Figure 3:
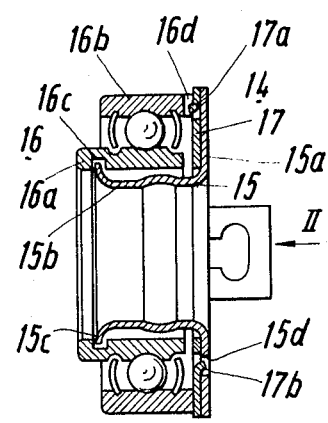
FIG. 3 is a sectional view taken along the line III—III in FIG. 2.

In the embodiment of FIGS. 2 and 3 there is shown a centrally guided clutch release 14 comprising a mounting 15 and a bearing 16 situated thereon. The bearing 16 has an inner race 16a which serves to engage the clutch release means while a clutch operating means acts on the bearing via the outer race 16b. The mounting 15 has an axially extending part or sliding guide 15b, by means of which the clutch release can be placed on a guide tube. Securing means are provided in the form of a flange 15c which engages a groove 16c of the rotating bearing inner race 16a. The flange 15c and the groove in the inner race 16a are dimensioned so that the flange 15c and the race 16a do not touch each other, at least in the condition of contact with the relase means of the clutch, and the limited play for centering the bearing relative to the axis of the clutch is not impaired. Between the bearing 16 and the mounting 15, there is provided a washer-shaped element 17, which has two diametrically opposite projections 17a which are bent out from the general plane of the element 17 and which engage slots or guides 16d in the non-rotating outer bearing race 16b, such slots or guides 16d being provided for this purpose and matched to accommodate the projections 17a. Accordingly, it is possible for the bearing 16 to have play between the intermediate element 17 and the mounting 15 in one direction. That is, in the vertical direction as viewed in FIG. 2.

In the other direction, that is perpendicular thereto or in the transverse direction as seen by the viewer, play or displacement for the bearing 16, including the intermediate element 17, is made possible by providing on element 17 prong-like, bent-out projections 17b which engage longitudinal slots or guides 15d in the mounting 15, so that the projections 17b can slide therein to a limited extent.

With the above arrangement, it will be seen that the bearing 16 can center itself properly into any position on an axis of rotation of the clutch which is situated outside the axis of the clutch release.

However, in the embodiment of FIGS. 2 and 3, a sleeve similar to that of FIG. 1 can also be used as the holding or securing means and, similarly, a cup spring and a friction lining can be provided so that the bearing then remains in position once centered on the axis of the clutch.

Figure 4:
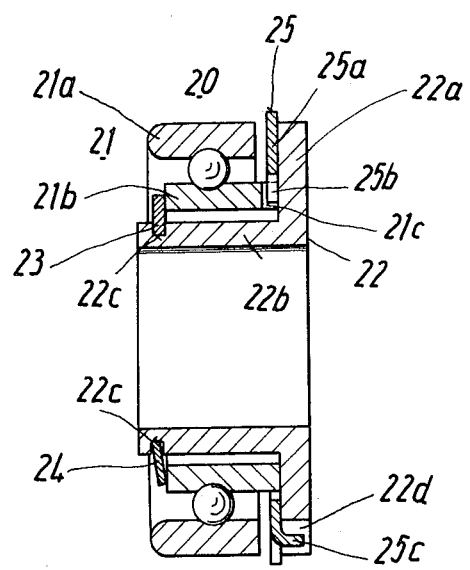
FIG. 4 is a sectional view corresponding to the sectional view of FIG. 3 but relating to another alternate embodiment.

FIG. 4 shows another alternate embodiment comprising a clutch release 20 in which the outer race 21a of a bearing 21 is arranged to rotate while the inner race 21b is in contact with a radial flange 22a of a mounting which is in the form of a sliding sleeve 22. As a securing or holding means for securing the bearing 21 with respect to the mounting 22, a snap ring 23 which is shown in the upper part of FIG. 4 has a portion thereof inserted into a groove 22c in the axially extending portion 22b of the mounting 22 while in the lower part of FIG. 4, the securing or holding means is shown as a cup spring 24 which bears, on the one hand, against the stationary inner bearing race 21b and, on the other hand, against the side of groove 22c. The view of FIG. 4 is similar to that of FIG. 3 in that it corresponds to a cross section taken along a line corresponding to line III—III of FIG. 2.

An intermediate element 25 which has a ring-shaped part 25a comprises two diametrically opposite, radially inwarddirected projections 25b (only one of these projections 25b is shown in FIG. 4) which engage slots 21c in the bearing race 21b, whereby the bearing 20 is able to move axially and thereby have play in the axial direction.

At right angles to this direction of motion, the intermediate element 25 has two extensions in the form of prongs 25c (one prong 25c is shown in the lower portion of FIG. 4) which engage in slots 22d in the radial part 22a of the mounting 22, whereby the bearing is movable and has play in the direction perpendicular to the axis, running to or from the viewer, together with the intermediate element 25.

Figure 5:
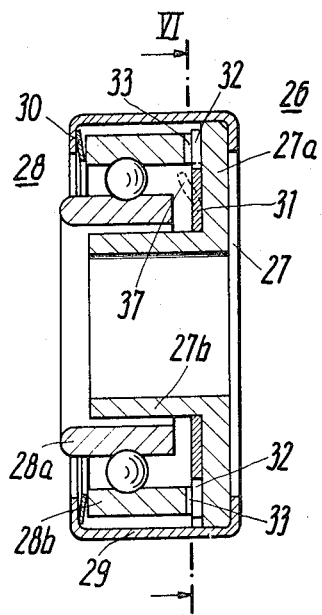
FIG. 5 is a sectional view taken along the line V—V of FIG. 6 showing yet a further alternate embodiment.
Figure 6:
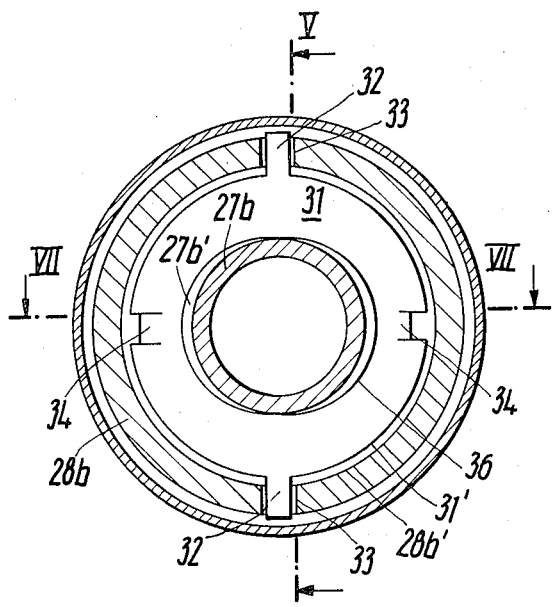
FIG. 6 is a sectional view taken along the line VI—VI of FIG. 5.
Figure 7:
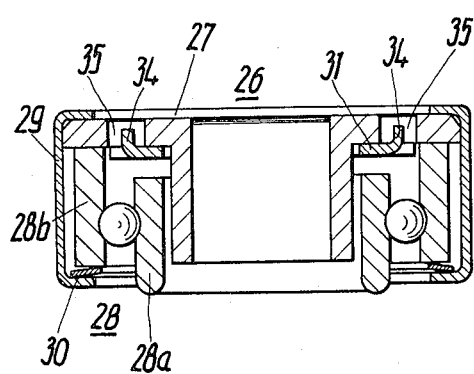
FIG. 7 is a sectional view taken along the line VII—VII of FIG. 6.

A further embodiment of the invention is shown in FIGS. 5 to 7.

In this latter embodiment, a clutch release 26 again comprises a mounting 27 for a centrally guided clutch release in which the mounting comprises a radial flange portion 27a and a sliding guide member 27b. A bearing 28 having a rotating inner bearing race 28a and an outer stationary bearing race 28b is held on the mounting 27 by means of sheet-metal sleeve 29 which partly extends over the bearing 28. A cup spring 30 bears, on the one hand, against an end portion of the sleeve 29 and, on the other hand, against the stationary outer bearing race 28b.

Between the radial flange 27a and the bearing 28, there is disposed an intermediate element 31 which comprises a base body which is, at least approximately circular. In order to provide for movement of the bearing 28 in one direction, that is in the vertical direction as viewed in FIG. 5, two diametrically opposite projections 32 extend radially outwardly from the base body 31. The projections 32 engage slots 33 in the outer bearing race 28b, the arrangement being such that the bearing 28 can be moved vertically, as viewed in FIG. 5, relative to the mounting 27.

To provide for movement of the bearing 28 in the horizontal direction, as viewed in FIG. 5, together with the intermediate element 31 relative to the mounting 27, a guide is provided at right angles to the guide 32,33 which consists of prongs 34 on the element 31 and recesses 35 in the flange 27a for receiving the prongs 34.

As in the case of the preceding embodiments, the bearing 28 is able to center itself with respect to any axis of the clutch which is situated to the side of the axis of the clutch release.

In order to prevent the revolving inner race 28a from rubbing against the sleeve-shaped part 27b, the sleeve 29 can either be disposed an appropriate distance from the bearing 28 and limit the play accordingly, or the intermediate element 31 can be used for this purpose. Thus, for limiting the play, for instance in the vertical direction as viewed in FIG. 5, the intermediate element 31 may be provided with a recess 36 which is in contact at its upper and lower part with the sliding sleeve 27b so that the intermediate element 31 cannot move in a vertical direction as viewed in FIG. 6. However, the intermediate element 31 can move relative to the bearing 28 in this direction according to the vertical distances between the inner contour 28b' of the outer race 28 and the outer contour 31' of the intermediate element 31. The movement of the bearing 28 in the horizontal direction, together with the intermediate element 31, is made possible by the fact that the recess 36 has a larger dimension in the horizontal direction (see FIG. 6) than the outer contour 27b' of the sliding sleeve 27b. The limitation of the bearing movement in this direction is therefore set by the distance between the recess 36 and the contour 27b prevailing in the horizontal direction as viewed in FIG. 6.

The limitation of the bearing movement relative to the intermediate element 31 can, however, also be obtained, as indicated in FIG. 5 by broken lines, by bending out a projection 37 from intermediate element 31 against which the non-rotating outer race 28b can bear.

Figure 8:
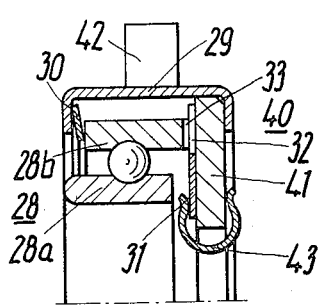
FIG. 8 is a partial sectional view of yet a further alternate embodiment.

FIG. 8 relates to a further alternate embodiment and shows in a partial cross section a pivoted clutch release 40 which corresponds to the embodiment according to FIGS. 5 to 7 with the exception of the sliding sleeve 27. In FIG. 8, a sleeve 29 is pressed on a mounting 41 and there is provided engagement and holding means 42, known per se, for a release fork. The mounting 41,29 extends over the bearing in cage-like fashion and a bearing 28 is thereby secured in the mounting. The bearing 28 is held in position by means of a cup spring 30 and optionally by means of friction linings which may be provided between the cup spring 30 and the outer bearing race 28b or, between the outer bearing race 28b and the mounting part 41, and whereby displacement occurs upon further operation of the clutch only by the displacement of the clutch release means which occurs due to wear of the clutch disc.

It is preferable to provide at least the intermediate element with corrosion protection, slide protection, wear protection or the like, for instance, by phosphatizing, "Tenifer" treatment, hardening, chrome-plating or the like, or teflon-coating or similar measures.

It may further be preferable to provide displacement resistance acting, on the one hand, between the bearing and the intermediate element and/or between the mounting and the intermediate element, for instance, by friction, as indicated in the last mentioned embodiment of FIG. 8 by a spring clamp 43.

The present invention is not limited to the examples of the embodiments shown but extends also to other embodiments in which, while retaining the play of the bearing relative to its mounting for the purpose of automatic centering with respect to the axis of the clutch, rotation of the bearing relative to the mounting is prevented, for example, by a positive-locking protection against rotation of the bearing race that does not rotate with the release means.

I claim:

1. Clutch release device for use in motor vehicle clutches or the like of the type having clutch release means and clutch operating means, comprising a bearing having two races, the first of which is engaged by said clutch release means and the second of which is acted upon by said clutch operating means, means for mounting said bearing in a manner to provide for limited movement of said bearing relative to said mounting to provide for centering of said bearing with respect to the axis of the clutch, and positive locking securing means for preventing rotation of one of said bearing races.

2. Clutch release device according to claim 1, wherein said securing means is disposed between said second bearing race and said mounting means.

3. Clutch release device according to claim 1, wherein said securing means comprises a projecting stop element extending between said mounting means and said second bearing race.

4. Clutch release device according to claim 1, wherein said securing means comprises two guide means disposed between said mounting means and said bearing, said two guide means each being located at different circumferential spaced positions and perpendicular to the axis.

5. Clutch release device according to claim 4, wherein one of said guide means comprises a guide element extending in one direction from said second bearing race and the other of said guide means comprises a guide element extending in an opposite direction from said mounting means.

6. Cutch release device according to claim 4 comprising an intermediate element disposed between said second bearing race and said mounting means, said bearing being movable with respect to the intermediate element and the holder, in one direction, and said bearing being movable together with said intermediate element, in the other direction relative to the holder.

7. Clutch release device according to claim 6, wherein said intermediate element comprises a plate-like member.

8. Clutch release device according to claim 6, wherein said intermediate element is provided with projecting means and said second bearing race is provided with slot means, said projecting means being received in said slot means.

9. Clutch release device according to claim 6, wherein said intermediate element is provided with projecting means and said mounting means is provided with slot means, said projecting means being received in said slot means.

10. Clutch release device according to claim 1, wherein said securing means comprises an element having at least one recess extending in an axial direction, said recess being larger at least in the direction of motion of said element than the axial area of the mounting means over which it extends.

11. Clutch release device according to claim 1, comprising means providing for limited movement of said bearing in a radial direction relative to said mounting means.

12. Clutch release device according to claim 1, comprising holding means for said bearing which permits limited movement of said bearing relative to said holding means and said mounting means.

13. Clutch release device according to claim 1, wherein said mounting means extends over said bearing in cage-like fashion.

14. Clutch release device according to claim 1, further comprising an operating device for said clutch operating means disposed on said mounting means.

15. Clutch release device according to claim 1, wherein holding means secures said second race, said holding means extending over and being radially spaced from said mounting means a distance corresponding to the amount of play.

16. Clutch release device according to claim 15, comprising resilient means disposed between said holding means and said second race, said resilient means being resilient in an axial direction.

17. Clutch release device according to claim 1, comprising holding means for one of said bearing races, said holding means being a resilient member which is resilient in an axial direction.

18. Clutch release device according to claim 6, wherein said intermediate element has an opening with a configuration which limits the extent of movement of said bearing in a radial direction.

19. Clutch release device according to claim 6, comprising resilient means resisting displacement of said bearing and intermediate element.

* * * * *